US008447723B2

(12) United States Patent
Hirooka

(10) Patent No.: US 8,447,723 B2
(45) Date of Patent: May 21, 2013

(54) INFORMATION PROCESSING APPARATUS AND METHOD THEREOF TO GENERATE A CONTENT LIST FROM CONTENT GROUPS

(75) Inventor: Shigeki Hirooka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 12/326,805

(22) Filed: Dec. 2, 2008

(65) Prior Publication Data

US 2009/0144227 A1 Jun. 4, 2009

(30) Foreign Application Priority Data

Dec. 3, 2007 (JP) ................................. 2007-312659

(51) Int. Cl.
*G06F 7/00* (2006.01)
*G06F 17/00* (2006.01)

(52) U.S. Cl.
USPC ........... 707/609; 707/610; 707/611; 707/613; 707/616; 709/248

(58) Field of Classification Search
USPC   707/609, 610, 611, 613, 616, 999.1; 709/248
See application file for complete search history.

(56) References Cited

U.S. PATENT DOCUMENTS

| | | | |
|---|---|---|---|
| 2004/0073610 A1* | 4/2004 | Terada et al. ................ | 709/203 |
| 2004/0143667 A1* | 7/2004 | Jerome ........................ | 709/228 |
| 2005/0080807 A1* | 4/2005 | Beilinson et al. ............ | 707/102 |
| 2005/0165841 A1* | 7/2005 | Kasperkiewicz et al. .. | 707/104.1 |
| 2006/0112074 A1* | 5/2006 | Han .............................. | 707/2 |
| 2006/0195521 A1* | 8/2006 | New et al. .................... | 709/204 |
| 2006/0244847 A1* | 11/2006 | Nagaoka et al. ........ | 348/231.99 |
| 2007/0024722 A1* | 2/2007 | Eura et al. .................. | 348/231.2 |
| 2007/0201822 A1* | 8/2007 | Kusunoki et al. ............... | 386/83 |
| 2007/0223037 A1* | 9/2007 | Sasaki et al. ................. | 358/1.16 |
| 2007/0288517 A1* | 12/2007 | Takatsuka .................. | 707/104.1 |
| 2007/0300279 A1* | 12/2007 | Kim et al. .................... | 725/132 |
| 2008/0091717 A1* | 4/2008 | Garbow et al. ............ | 707/104.1 |
| 2008/0243837 A1* | 10/2008 | Davis et al. ..................... | 707/5 |
| 2008/0307362 A1* | 12/2008 | Chaudhri et al. ............ | 715/835 |

FOREIGN PATENT DOCUMENTS

JP            2005-84752 A      3/2005

* cited by examiner

*Primary Examiner* — Hares Jami

(74) *Attorney, Agent, or Firm* — Carter, DeLuca Farrell & Schmidt LLP

(57) ABSTRACT

In an information processing apparatus including a first content group, to which an external device including a second content group is connected, a content list is created from a content group in which the first and second content groups have been integrated. Attribute information of the content is acquired in accordance with the type of the content included in the second content group, a control method for the content list is determined based on the acquired attribute information, and the content list is processes in accordance with the determined control method.

6 Claims, 13 Drawing Sheets

INFORMATION PROCESSING APPARATUS AND METHOD THEREOF TO GENERATE A CONTENT LIST FROM CONTENT GROUPS

BACKGROUND OF THE INVENTION

1. Field of the Invention

The present invention relates to an information processing apparatus and method thereof in which an external apparatus that includes a second content group is connected to an information processing apparatus that includes a first content group.

2. Description of the Related Art

Conventional personal computers commonly refer to various types of content (still images, videos, music, documents, and so on) and display a list of reference information, such as representative images or titles of the content, in a specific order (a content list). Furthermore, by connecting a device or storage medium and executing an application program corresponding to that device or medium, personal computers are capable of creating lists of the content contained within the device or medium.

Some recent digital household electronic devices also have functions for creating lists of content held by all devices connected to a network within the household, which is implemented by the various devices connected to the household network communicating with one another. Such digital household electronic devices display lists of all the content, lists of only specific types of content, or lists of content processed according to a predetermined fixed rule, such as a list of content arranged in a specific order.

Meanwhile, there exists a technique for selecting content and determining the playback order thereof based on a user's preferences, the communication environment, and attribute information, such as the genre, of the content, receiving the content from a content server, and playing back the received content (for example, see Japanese Patent Laid-Open No. 2005-84752, called "Patent Document 1" hereinafter).

However, a conventional content listing device such as that described above has the following problems.

First, when displaying only a list of the content within a connected device or a storage medium, a list of the content in other devices cannot be displayed. Therefore, a user must skip between multiple content lists, or perform another search across multiple devices, making the process complicated.

Furthermore, when displaying a list of content processed according to a predetermined fixed rule, there is the risk that the content present in a device that has been newly connected for the purpose of browsing its content will be obscured by other content.

Finally, according to the invention disclosed in Patent Document 1, the attribute information of content is used only as a means for evaluating the content during selection. Therefore, even when a new content group has been added, the method for controlling the overall content list is not determined by the attribute information of the content included in that new content group. For this reason, there is a problem that the newly-added content will not be displayed at all in the selection results.

SUMMARY OF THE INVENTION

It is an object of the present invention to determine a method for controlling a content list based upon attribute information of the content included in a content group that is to be integrated, and to process the content list in accordance with the determined method of control.

According to one aspect of the present invention, there is provided an information processing apparatus including a first content group, to which an external device including a second content group is connected, the apparatus comprising: an integration unit configured to integrate the first and second content groups; an acquisition unit configured to acquire attribute information of content included in the second content group; and a determination unit configured to determine the content, from the content groups integrated by the integration unit, to generate a content list, based on the attribute information included in the second content group acquired by the acquisition unit.

According to another aspect of the present invention, there is provided an information processing apparatus including a first content group, to which an external device including a second content group is connected, the apparatus comprising: an integration unit configured to integrate the first and second content groups; an acquisition unit configured to acquire the attribute information of the content included in at least one of the first content group and the second content group; and a determination unit configured to determine the content, from the content groups integrated by the integration unit, to generate a content list, based on the attribute information included in one of the first content group and the second content group as acquired by the acquisition unit.

According to still another aspect of the present invention, there is provided a method of processing executed by an information processing apparatus including a first content group, to which an external device including a second content group is connected, the method comprising: integrating the first and second content groups; acquiring attribute information of content included in the second content group; and a determining the content, from the integrated content groups, to generate a content list, based on the attribute information included in the second content group.

Further features of the present invention will become apparent from the following description of exemplary embodiments with reference to the attached drawings.

DESCRIPTION OF THE EMBODIMENTS

Embodiments for carrying out the present invention shall be described in detail hereinafter with reference to the drawings.

Figure 1:
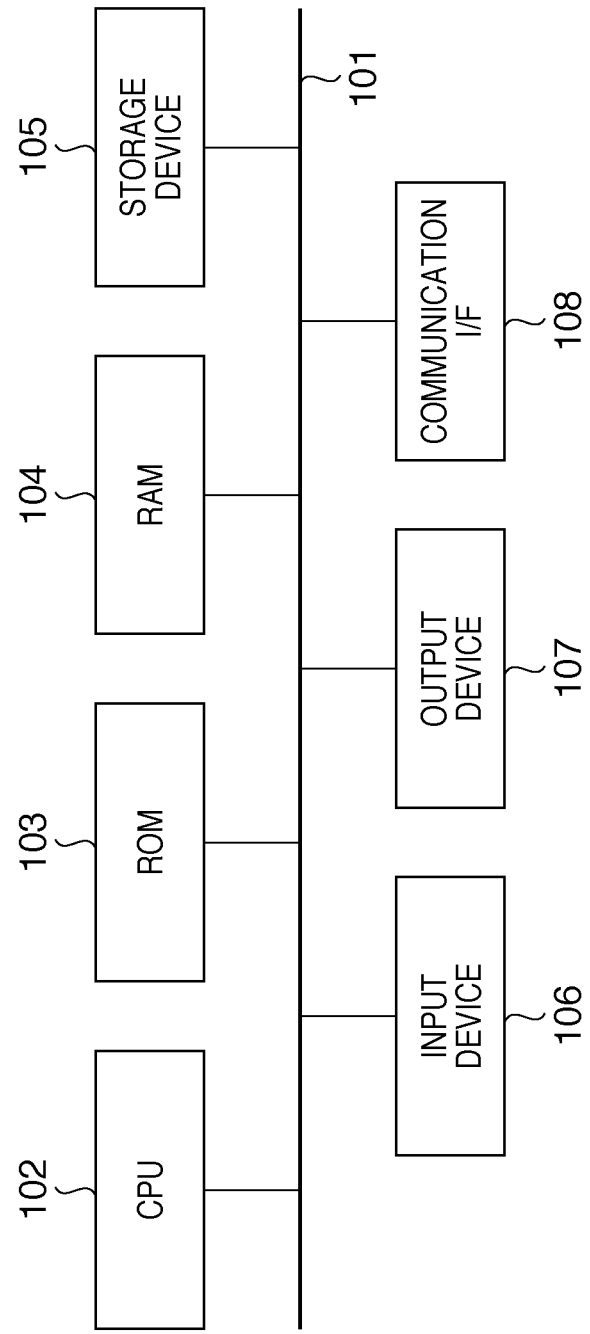
FIG. 1 is a conceptual diagram illustrating an example of the hardware configuration of a content listing device according to a first embodiment.

FIG. 1 is a conceptual diagram illustrating an example of the hardware configuration of a content listing device according to the first embodiment. Reference numeral 102 is a CPU that performs computations and logical determinations for various processes, and controls various constituent elements connected to a bus 101. A memory, including a program memory and a data memory, is installed in the content listing device. Various processing procedures (or in other words, programs, the details of which are indicated in the flowcharts described later) for the control performed by the CPU 102 are stored in the program memory. This memory may be a ROM 103, or may be a RAM 104 into which programs are loaded from an external storage device.

Reference numeral 105 is a storage device, such as a hard disk, for storing data, programs, or the like. Reference numeral 106 is an input device, such as a keyboard or a mouse, through which a user inputs instructions. Reference numeral 107 is an output device such as a CRT, a liquid-crystal display (LCD), a speaker, or the like that includes a circuit for output. A content list is output through the output device 107. Reference numeral 108 is a communication interface (I/F) for controlling communication with external devices, storage media, and the like.

According to the stated configuration, the content listing device confirms the connection and disconnection to and from external devices, storage media such as flash memories, and so on via the communication I/F 108. Attribute information of the content held in the connected external device is then acquired in order to determine the content to be used in the content list display and the control method thereof. Here, the attribute information may be acquired from a newly-connected device, or may be acquired from a storage medium connected via the communication I/F 108, a device connected to the network, or the like.

Note that although the content listing device according to the present invention can be implemented using an information processing apparatus such as a personal computer, it is also possible to configure the content listing device as a dedicated device.

Figure 2:
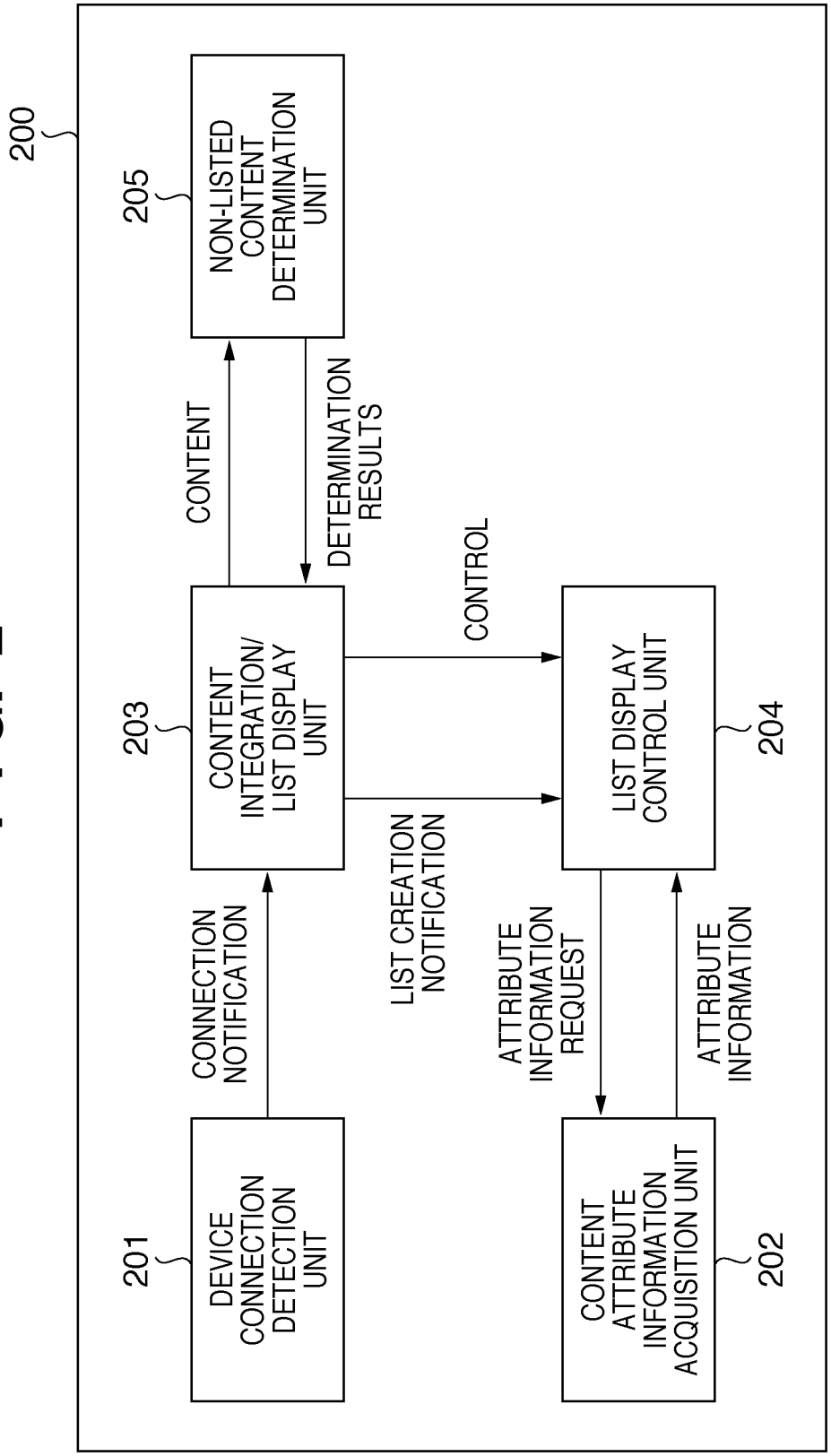
FIG. 2 is a conceptual diagram illustrating an example of the software configuration of the content listing device according to the first embodiment.

FIG. 2 is a conceptual diagram illustrating an example of the software configuration of the content listing device according to the first embodiment. Reference numeral 200 represents the software of the content listing device. Reference numeral 201 is a device connection detection unit that detects a connection made to the communication I/F 108 from a storage medium, a device connection to the network via the communication I/F 108, and so on. 202 is a content attribute information acquisition unit that acquires attribute information of content from storage media connected via the communication I/F 108, devices connected to the network, and so on. Reference numeral 203 is a content integration/list display unit that integrates content and displays a list thereof. The content integration/list display unit 203 acquires content from a connected device in response to a connection notification from the device connection detection unit 201, integrates the acquired content with the content of other devices including the content listing device itself, and creates a content list.

Reference numeral 204 is a list display control unit that determines a control method based on the attribute information of the content and controls the list display performed by the content integration/list display unit 203. The list display control unit 204 acquires the attribute information of the content from the content attribute information acquisition unit 202 in response to a list creation notification from the content integration/list display unit 203, and determines a control method based on that attribute information. The content integration/list display unit 203 is then controlled by the list display control unit 204 to carry out the list display according to the control method that has been determined. Reference numeral 205 is a non-listed content determination unit that determines whether or not content may be displayed in a list when the content integration/list display unit 203 creates the list display for that content.

Figure 3:
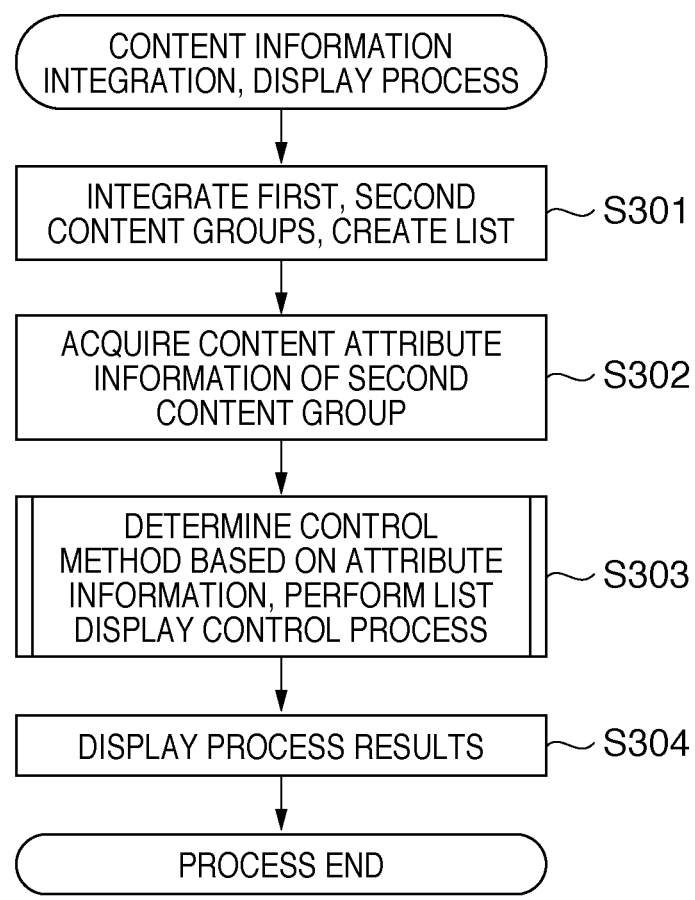
FIG. 3 is a flowchart illustrating an example of a content information integration and display process according to the first embodiment.

FIG. 3 is a flowchart illustrating an example of a content information integration and display process according to the first embodiment. In FIG. 3, S301 to S304 indicate individual steps.

First, the content held in a newly-connected device is integrated with the content acquired and held by a content listing device up until that point or the content from a storage medium or devices connected to the network, and a content list is created (S301). Next, the attribute information of a second content group, or in other words, the content held in the newly-connected device in the first embodiment, is acquired from the storage medium connected via the communication I/F 108, the device connected to the network, or the like (S302). The control method is then determined based on the attribute information, and the process of controlling the list display is carried out (S303). The process for determining this control method based on the attribute information and the list display control process of S303 shall be described in further detail later using FIG. 4. The results of the processing performed in S303 are then displayed in the output device 107 (S304), after which the process ends.

Figure 4:
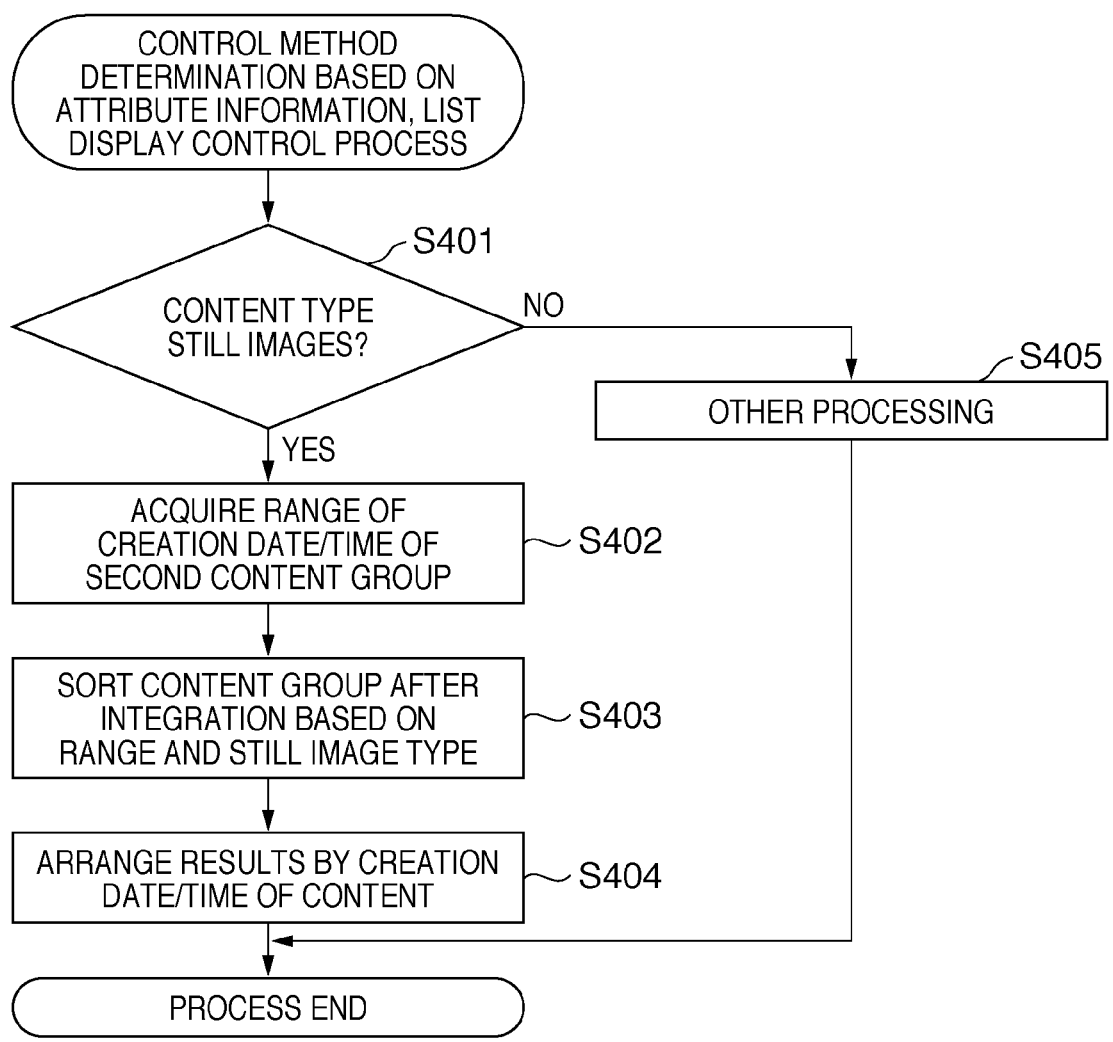
FIG. 4 is a flowchart illustrating an example of control method determination based on attribute information and a list display control process according to the first embodiment.

FIG. 4 is a flowchart illustrating an example of the control method determination based on attribute information and the list display control process according to the first embodiment. In FIG. 4, S401 to S405 indicate individual steps.

First, the content type, which is attribute information of the second content group, or in other words, the content held in the newly-connected device, is acquired, and it is determined whether the type of all the content included in the second content group is still images (S401). In the case where the results of the determination indicate that the type of all the content is still images, the range of the creation date/time, which is attribute information of the still image content held in the newly-connected device, is acquired (S402).

Next, a sorting process is carried out on the post-integration content list held in the content integration/list display unit 203, in the creation date/time range of content acquired in S402 and using the content type of "still images" (S403). The results of this sorting are then rearranged based on the creation date/time of the content (S404), after which the processing ends.

Meanwhile, in the case where it has been determined in the abovementioned S401 that the type of all the content is not still images, other processing is carried out (S405), and the processing ends.

Figure 5:
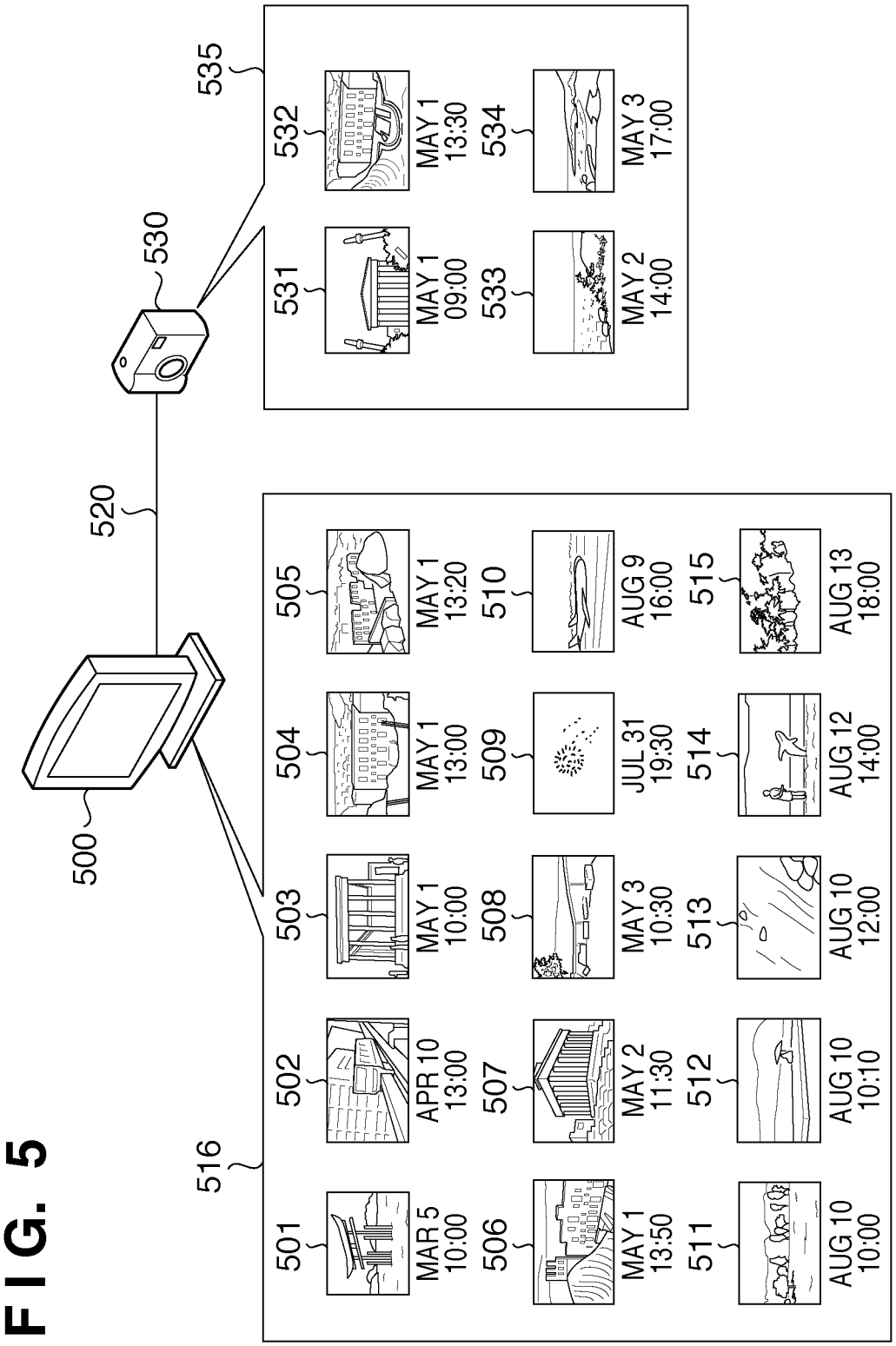
FIG. 5 is a conceptual diagram illustrating an example of the configuration of a content listing system according to the first embodiment.

FIG. 5 is a conceptual diagram illustrating an example of the configuration of a content listing system according to the first embodiment. In FIG. 5, reference numeral 500 represents the content listing device. Reference numeral 530 represents a digital camera connected to the content listing device 500. Reference numeral 520 represents a connection cable for connecting the digital camera 530 to the content listing device 500.

Here, 516 schematically illustrates a collection of still image content held in the storage device 105 in the content listing device 500. Reference numerals 501 to 515 indicate individual still image content.

Here, Reference numeral 535 schematically illustrates a collection of all content held in a memory of the digital camera 530. Reference numerals 531 to 534 indicate individual content.

In FIG. 5, each image shows a thumbnail image representing that content, and the character string below the image denotes the creation date/time of that content. Here, the still image content 501 to 515 is called a first content group, whereas the content 531 to 534 is called the second content group.

Figure 6:
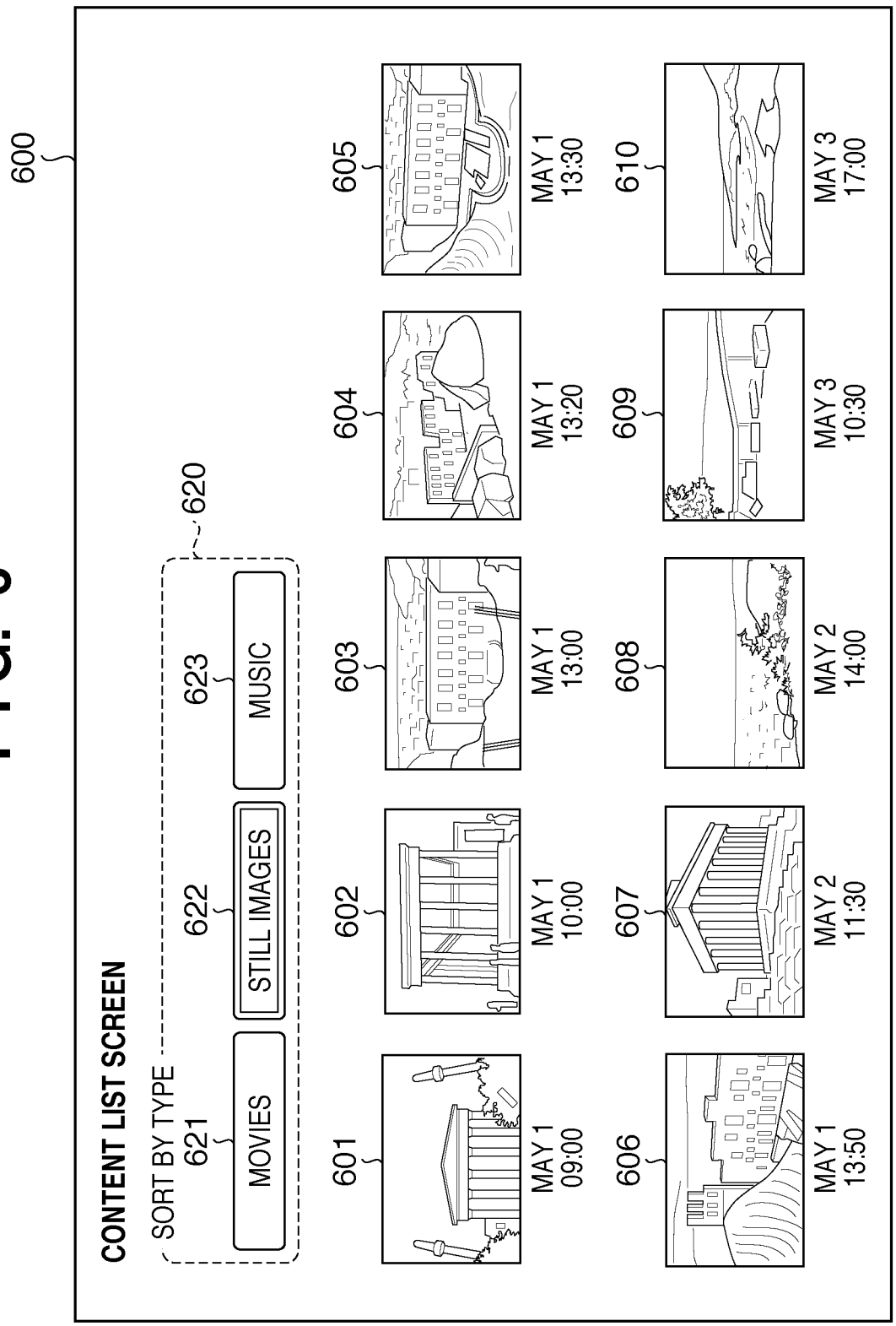
FIG. 6 is a conceptual diagram illustrating an example of the results of the list display control process carried out through the control method determined based on attribute information according to the first embodiment.

FIG. 6 is a conceptual diagram illustrating an example of the results of the list display control process carried out through the control method determined based on attribute information according to the first embodiment. In FIG. 6, reference numeral 600 represents the entirety of a content list display region displayed in the output device 107. Reference numerals 601 to 610 indicate individual content. In this manner, in the first embodiment, the content list displays a representative image for each piece of content and the creation date/time of the content below each representative image. Reference numeral 620 represents an area showing the type of content displayed. Reference numeral 621 to 623 are sorting state presentation buttons indicating that the content is being sorted based on the attribute information including movies, still images, and music, respectively. In this example, the outer frame of a still image button 622 is displayed differently from the other types, indicating that of all the content, only the still image content is being displayed.

Content 601, 605, 608, and 610 shown in FIG. 6 represent the content 531 to 534 shown in FIG. 5, whereas content 602 to 604, 606, 607, and 609 shown in FIG. 6 represent the content 503 to 508 shown in FIG. 5. Of the still image content group 516 shown in FIG. 5 and held in the content listing device 500, only the content included in the creation date range of a content group 535 held in the digital camera 530 is displayed in the list. Furthermore, the content included in the still image content group 516 held in the content listing device 500 and the content held in the digital camera 530 are arranged by the creation date/time and displayed.

In this manner, when the digital camera 530 is connected to the content listing device 500, a control method is determined based on the attribute information of the content included in a content group held in the digital camera 530 and a list display control process is performed through the processing illustrated in FIG. 3.

According to the first embodiment, the control determined based on the attribute information of the content included in the second content group can be performed automatically on a content list in which the first and second content groups have been integrated, and the results thereof can then be displayed. In particular, when a new device is connected, the integrated content groups can be sorted within a creation date/time range of the content held in that device, and the list can then be displayed having arranged the content by the creation date/times.

Next, a second embodiment according to the present invention shall be described in detail with reference to the drawings. The second embodiment describes a process for controlling the list display state using a control method determined based on the distribution of the attribute information of content included in a second content group.

Note that the configuration of the content listing device in the second embodiment is the same as the configuration described in the first embodiment and illustrated in FIGS. 1 and 2, and thus descriptions thereof shall be omitted.

Figure 7:
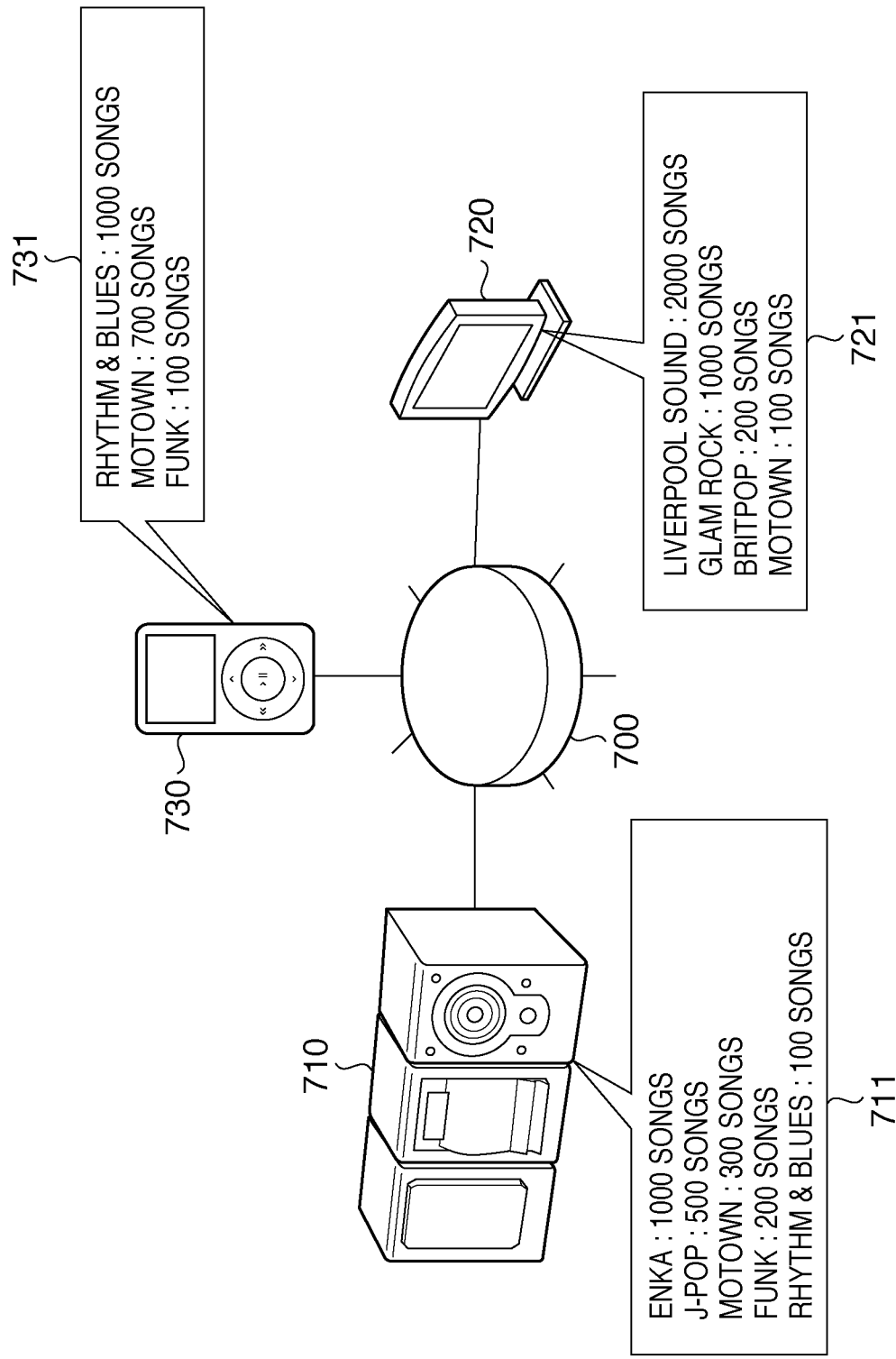
FIG. 7 is a conceptual diagram illustrating an example of the configuration of a content listing system according to a second embodiment.

FIG. 7 is a conceptual diagram illustrating an example of the configuration of a content listing system according to the second embodiment. In FIG. 7, reference numeral 700 represents a network that connects multiple devices to one another. Reference numeral 710 represents a music server connected to the network 700 in advance. Finally, reference numeral 711 represents a genre-by-genre structure of music content held in the music server 710.

Each line of the genre-by-genre structure 711 indicates information of a single musical genre, where the musical genre is shown to the left of the colon, and the number of songs belonging to that genre is shown to the right of the colon. For example, the topmost line shows that 1000 songs' worth of content whose musical genre is "Enka" (a traditional Japanese style of music) is held in the music server 710.

Reference numeral 720 represents the content listing device connected to the network 700 in advance. Reference numeral 721 represents a genre-by-genre structure of music content held in the content listing device 720. In the second embodiment, the result of integrating the content groups held by the music server 710 and the content listing device 720 shall be called a "first content group".

Reference numeral 730 represents a mobile music player newly-connected to the network 700. Reference numeral 731 represents a genre-by-genre structure of music content held in the mobile music player 730. In the second embodiment, the content group held by the mobile music player 730 shall be called a "second content group".

Figure 8:
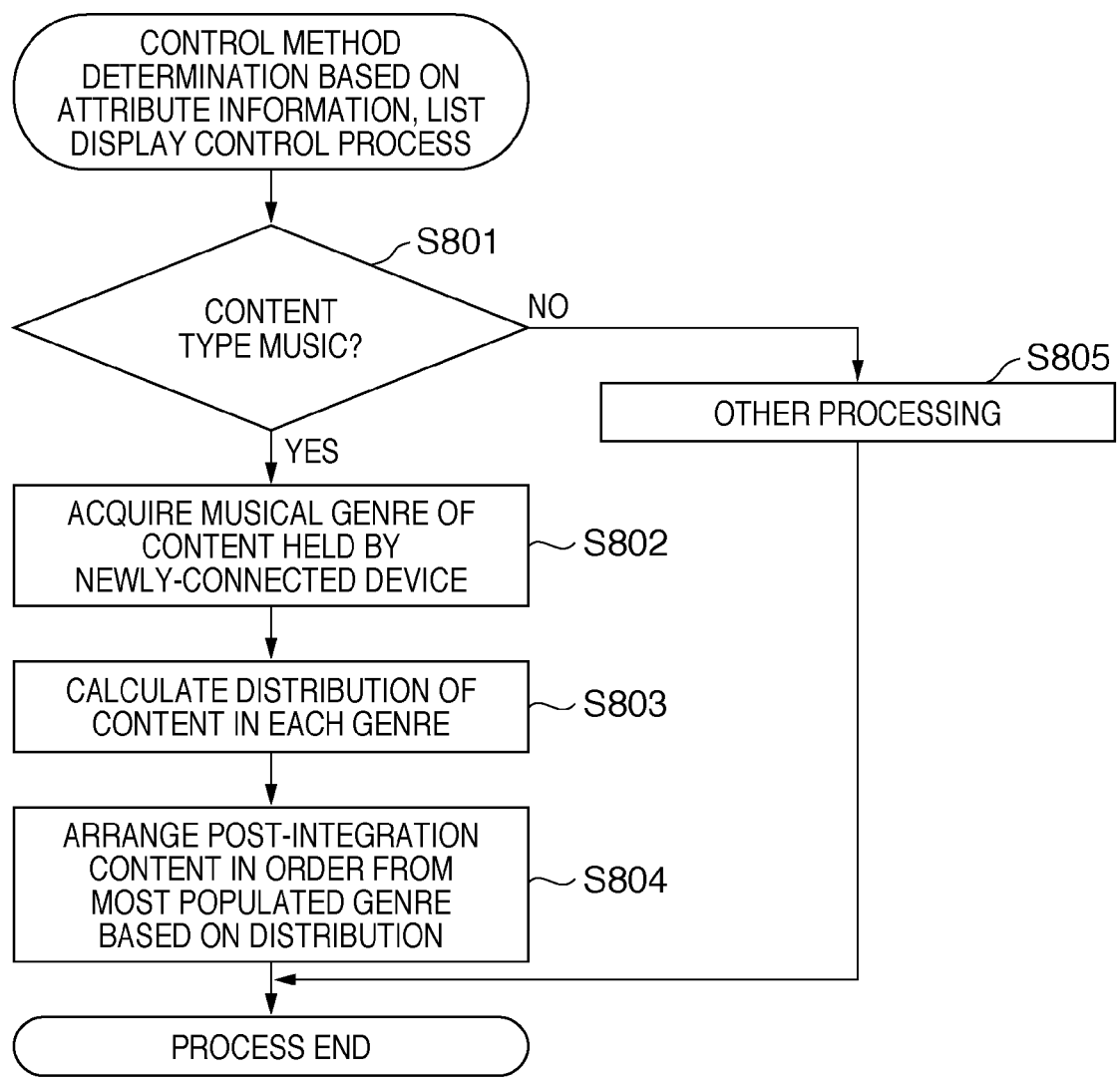
FIG. 8 is a flowchart illustrating an example of control method determination based on attribute information and a list display control process according to the second embodiment.

FIG. 8 is a flowchart illustrating an example of control method determination based on attribute information and a list display control process according to the second embodiment. In FIG. 8, S801 to S805 indicate individual steps.

First, the content type, which is attribute information of the second content group, or in other words, the content held in the newly-connected mobile music player 730, is acquired, and it is determined whether the type of all the content included in the second content group is "music" (S801). In the case where the results of the determination indicate that the type of all the content is "music", the musical genre, which is attribute information of the content held by the newly-connected mobile music player 730, is acquired (S802).

Next, the distribution of the musical genres of the content acquired in S802 is calculated (S803). The post-integration content is then arranged in order starting with the genre with the most content based on the distribution (S804), after which the processing ends.

Meanwhile, in the case where it has been determined in the abovementioned S801 that the type of all the content is not "music", other processing is carried out (S805), and the processing ends.

Figure 9:
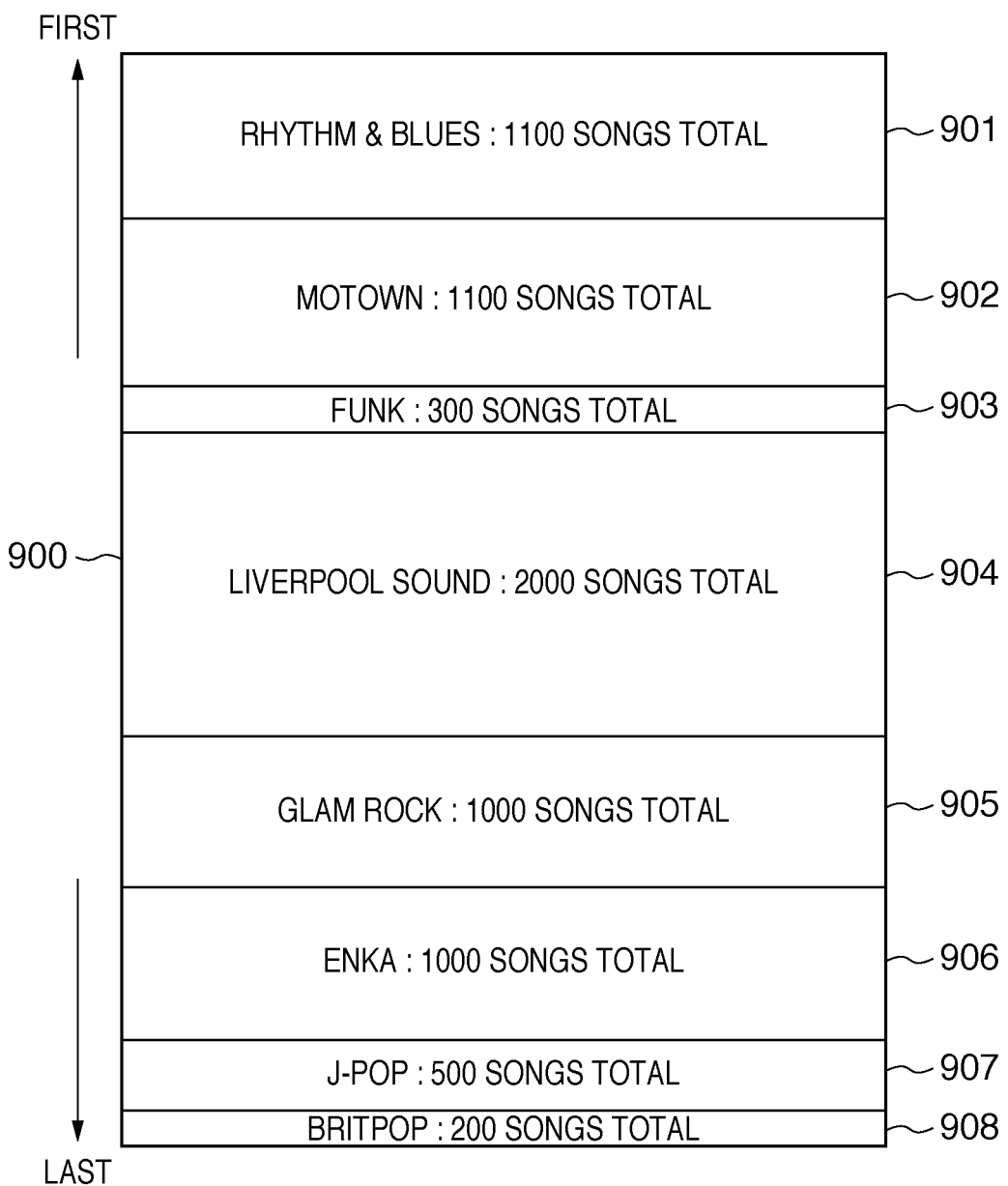
FIG. 9 is a conceptual diagram illustrating an example of the results of the list display control process carried out through the control method determined based on attribute information according to the second embodiment.

FIG. 9 is a conceptual diagram illustrating an example of the results of the list display control process carried out through the control method determined based on attribute information according to the second embodiment. In FIG. 9, 900 represents the entirety of the content following the list display control method determined based on the attribute information of the content included in the second content group. Reference numerals 901 to 908 indicate each musical genre and the number of songs that belong thereto, or in other words, the amount of content. These are arranged in the content list in order from 901 to 908.

As shown in FIG. 9, the content is arranged in accordance with the attribute information (genre-by-genre structure 731) of the music content held by the mobile music player 730, or in other words, in order starting with the musical genre with the most content.

According to the second embodiment, a control method determined in accordance with the distribution of values of specific attribute information for the content included in the second content group can be performed on a content group obtained by integrating the first and second content groups.

Next, a third embodiment according to the present invention shall be described in detail with reference to the drawings. The third embodiment describes a process for determining a control method based on attribute information of content included in a second content group and excluding content, specified in advance, based on the results of control performed on a list display.

Note that the configuration of the content listing device in the third embodiment is the same as the configuration described in the first embodiment and illustrated in FIGS. 1 and 2, and thus descriptions thereof shall be omitted.

Figure 10:
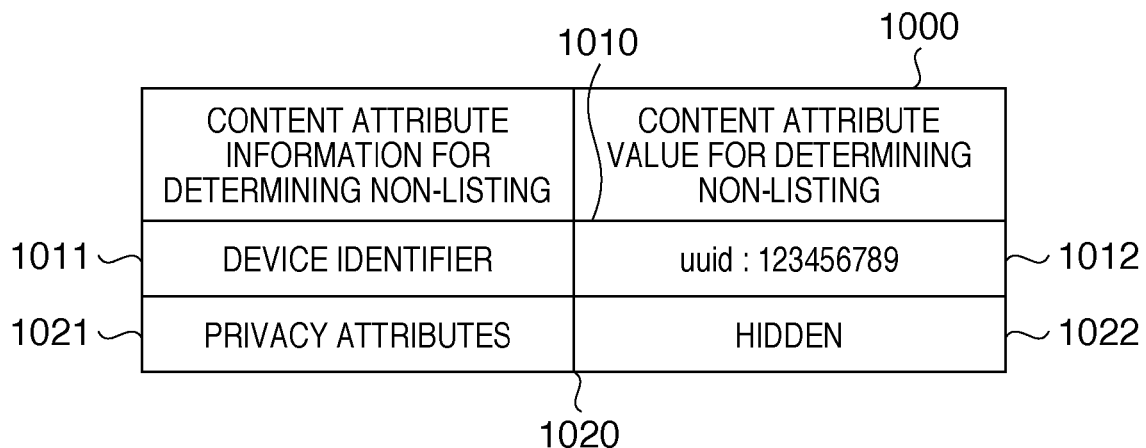
FIG. 10 is a conceptual diagram illustrating an example of the structure of data that holds information regarding non-listed content according to a third embodiment.

FIG. 10 is a conceptual diagram illustrating an example of the structure of data that holds information regarding non-listed content according to the third embodiment. In FIG. 10, 1000 represents the overall structure of the data that holds information regarding the non-listed content. This data structure is held in the ROM 103 or the storage device 105, and is referred to by the non-listed content determination unit 205 when determining the non-listed content.

Reference numerals 1010 and 1020 each represent information of non-listed content. The information regarding each non-listed content includes content attribute information for determining whether the content is to be excluded from listing, and a content attribute value specified as a condition for not listing the content. Meanwhile, reference numerals 1011 and 1021 are the content attribute information for determining whether the content is to be excluded from listing, and reference numerals 1012 and 1022 are the content attribute values specified as conditions for not listing the content.

In other words, the information 1010 regarding the non-listed content indicates that when the attribute information of the device that holds the content is "device identifier" and the attribute value thereof is "uuid: 123456789", the content corresponding thereto is not to be listed. In addition, the information 1020 regarding the non-listed content indicates that when the attribute information of the content is "privacy attribute" and the attribute value thereof is "hidden", the content corresponding thereto is not to be listed.

Figure 11:
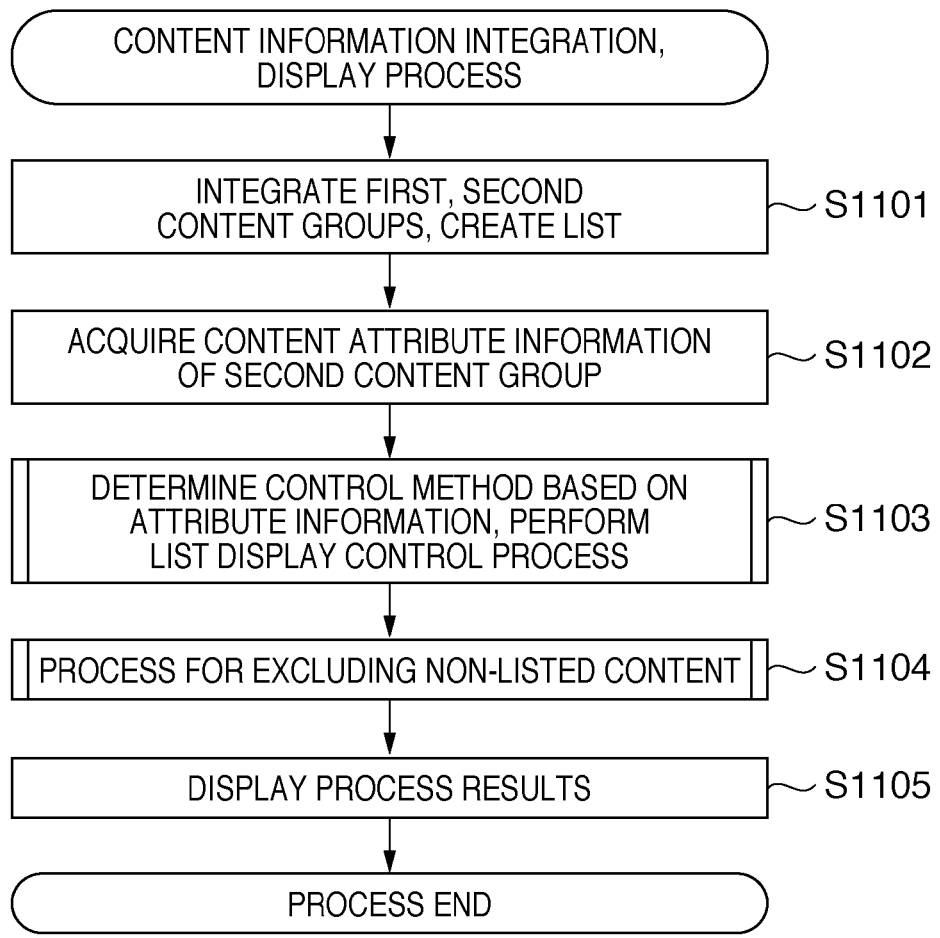
FIG. 11 is a flowchart illustrating an example of a content information integration and display process according to the third embodiment.

FIG. 11 is a flowchart illustrating an example of a content information integration and display process according to the third embodiment. In FIG. 11, S1101 to S1105 indicate individual steps.

First, the content held by a newly-connected device is integrated with the content acquired and held by a content listing device up until that point or the content from devices connected to the network, and a content list is created (S1101). Next, the attribute information of a second content group, or in other words, the content held in the newly-connected device in the first embodiment, is acquired from the storage medium connected via the communication I/F 108, the device connected to the network, or the like (S1102). The control method is then determined based on the attribute information, and the process of controlling the list display is carried out (S1103). The process for determining this control method based on the attribute information and the list display control process of S1103 are the same as in the first and second embodiments, and thus details thereof shall be omitted.

Next, the non-listed content determination unit 205 excludes the content to be excluded from the results of the process (S1104). The process of excluding the content to be excluded in S1104 shall be described in further detail later using FIG. 12. The results of the process from S1104 are then sent to the content integration/list display unit 203, and the content integration/list display unit 203 then displays a list from which the content to be excluded has been excluded (S1105). After this, the processing ends.

Figure 12:
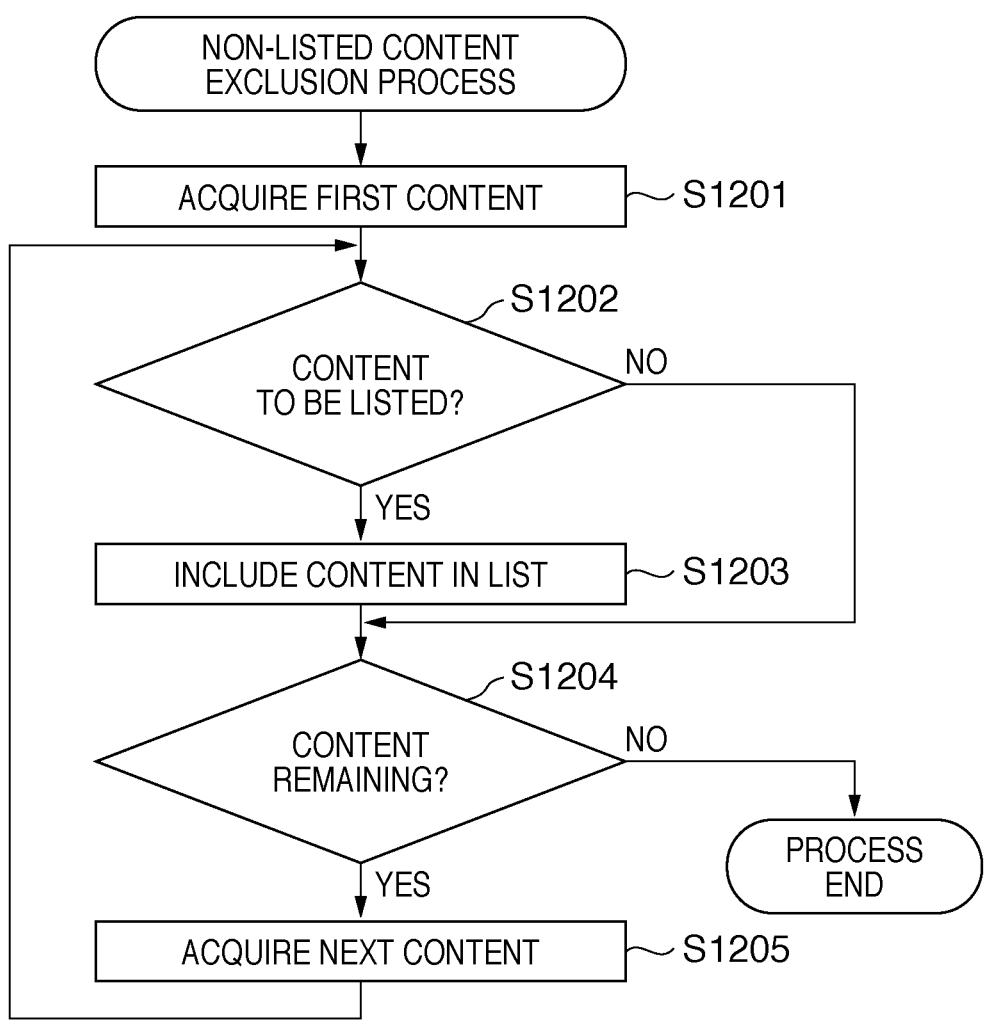
FIG. 12 is a flowchart illustrating an example of a process for excluding non-listed content according to the third embodiment.

FIG. 12 is a flowchart illustrating an example of a process for excluding non-listed content according to the third embodiment. In FIG. 12, steps S1201 to S1205 indicate individual steps.

First, a control method is determined based on the attribute information of the content included in the second content group, and the first content is acquired from the results of performing the control method on the list (S1201). It is then determined whether or not the first content is to be listed (S1202). This determination is made by referring to the data structure shown in FIG. 10 and held in the ROM 103 or the storage device 105. If the results of the determination indicate that content is to be listed, that content is included in the list (S1203). However, if that content is not to be listed, the procedure moves to S1204.

It is then determined whether or not content that has not undergone the process for excluding non-listed content is present (S1204). If the results of this determination indicate that such content is still present, that content is acquired (S1205), and the procedure returns to the determination performed in S1202. If, however, there is no such content in S1204, the processing ends.

According to the third embodiment, it is possible to exclude specific content from the list when determining a control method based on the attribute information of the content included in the second content group and displaying the results of the control process performed on the list.

Next, a fourth embodiment according to the present invention shall be described in detail with reference to the drawings. The fourth embodiment describes a process for determining the first content displayed in a list of integrated content groups in accordance with a range of specific attribute values added to the content of a second content group.

Note that the configuration of the content listing device in the fourth embodiment is the same as the configuration described in the first embodiment and illustrated in FIGS. 1 and 2, and thus descriptions thereof shall be omitted.

Figure 13:
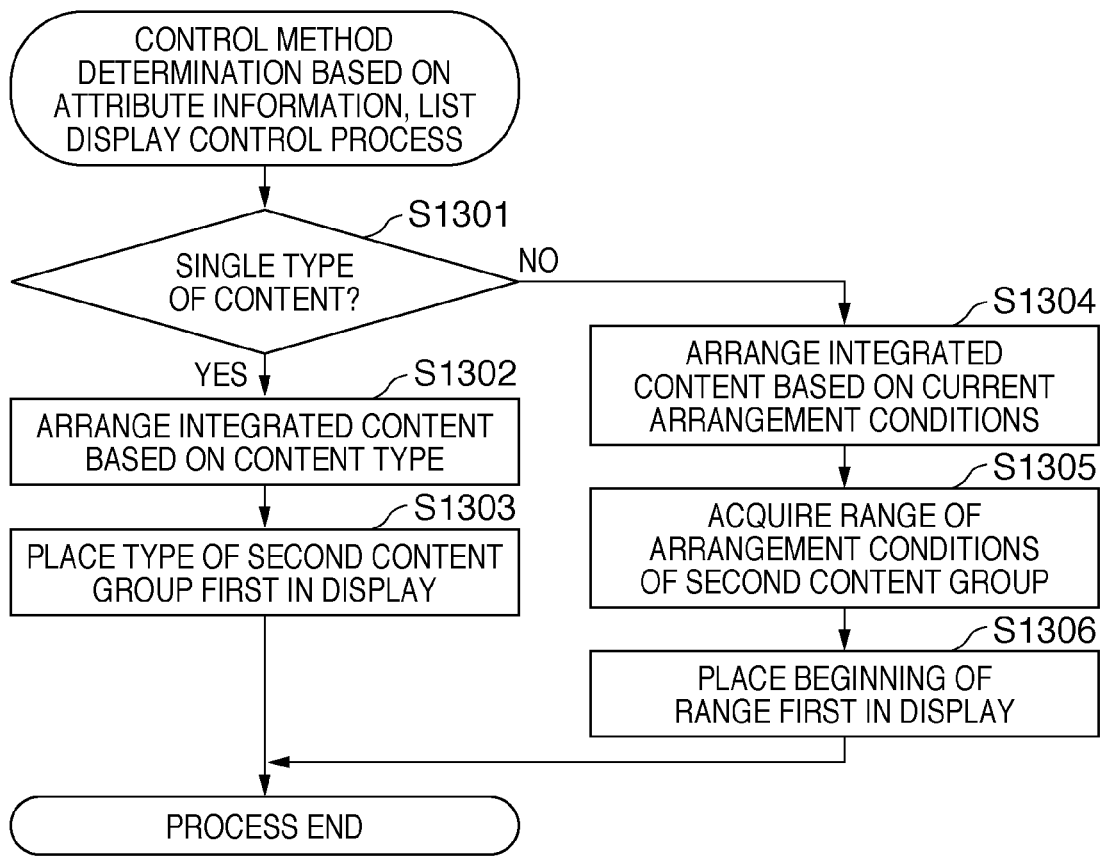
FIG. 13 is a flowchart illustrating an example of a list display control process carried out through a control method determined based on attribute information according to a fourth embodiment.

FIG. 13 is a flowchart illustrating an example of a list display control process carried out through a control method determined based on attribute information according to the fourth embodiment. In FIG. 13, steps S1301 to S1306 indicate individual steps.

First, it is determined whether there is a single content type, the content type being attribute information of the content included in the second content group, or in other words, content held in a newly-connected device (S1301). If the results of the determination indicate that there is a single content type, the integrated content is arranged based on the content type (S1302). The content type included in the second content group is then displayed first in the list (S1303), and the processing ends.

However, if it is determined in S1301 that there are multiple content types, the integrated content is arranged based on the current arrangement conditions of the content list (S1304). The range of the attribute values of the content included in the second content group, according to the attribute information of the content, is then acquired, this range serving as the arrangement conditions (S1305). The content corresponding to the beginning of the acquired range of values is displayed first in the list (S1306), and the processing ends.

According to the fourth embodiment, it is possible to determine the first content displayed in a list of integrated content groups in accordance with a range of specific attribute values added to the content of a second content group.

A process performed so that other content can be distinguished in a list display of a second content group shall be described as a variation.

Figure 14:
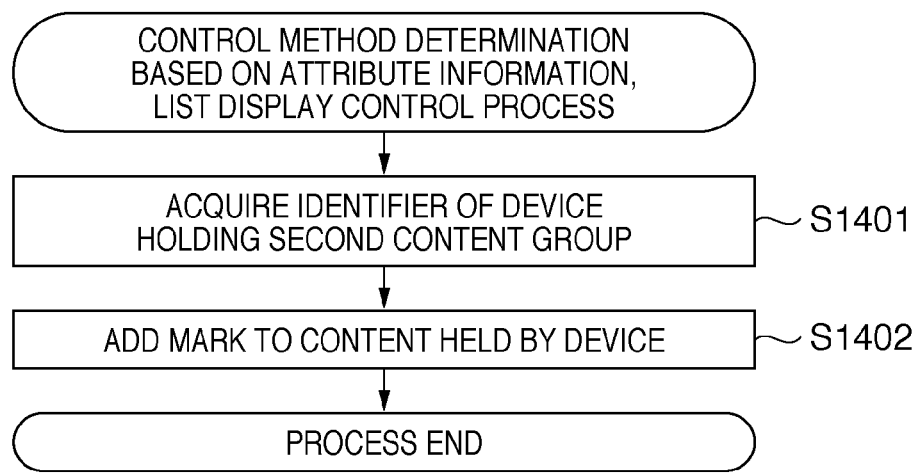
FIG. 14 is a flowchart illustrating an example of a list display control process according to a variation.

FIG. 14 is a flowchart illustrating an example of a list display control process according to a variation. In FIG. 14, steps S1401 and S1402 indicate individual steps.

First, the identifiers of belonging devices, serving as the attribute information of content held by connected devices and included in the second content group, are obtained (S1401). Next, a marker for distinguishing the content from other content in the list display is added to content that has that belonging device identifier as its attribute information (S1402), and the processing ends.

This makes it possible to identify the content included in the second content group at a glance.

In addition, the abovementioned list display control process may be configured to be implemented as a combination of the abovementioned multiple processes.

Figure 15:
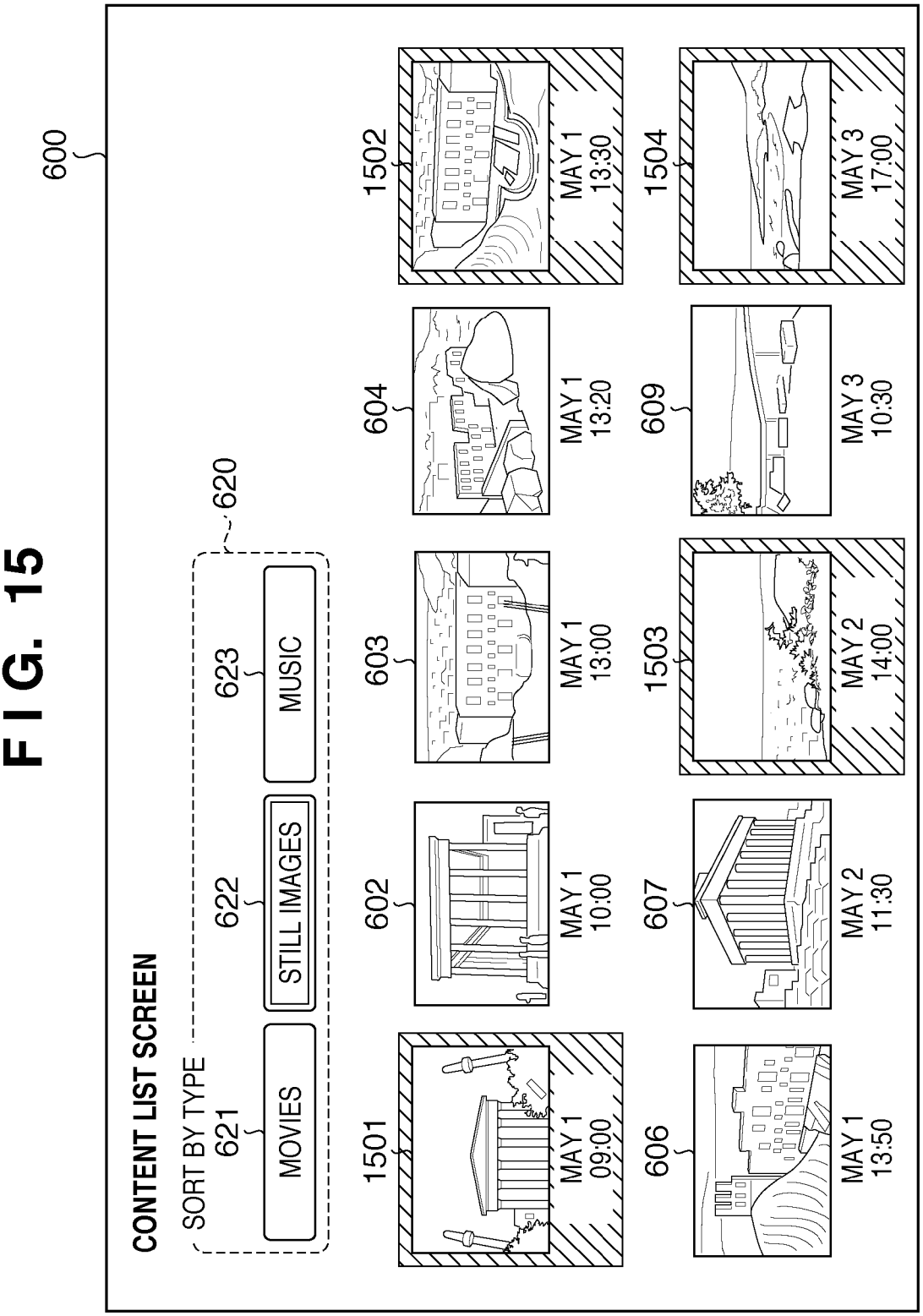
FIG. 15 is a conceptual diagram illustrating an example of the display of processing results obtained by performing the processing according to the variation after performing the processing according to the first embodiment.

FIG. 15 is a conceptual diagram illustrating an example of the display of processing results obtained by performing the processing according to the variation after performing the processing according to the first embodiment. In FIG. 15, 1501 to 1504 represent content that has been rendered easily distinguishable as content included in the newly-connected device through the processing illustrated in FIG. 14.

Through this, it is possible to perform a process that uses, as its conditions, the range, distribution, and the like of one or more pieces of content information of the content included in the second content group, and furthermore is possible to perform a list display as desired by the user without having to manually perform complex search and arrangement processes.

In addition, the configuration may be such that an inquiry as to whether or not to perform control based on the attribute information of the content included in the second content group is displayed in the output device 107 and the user can determine whether or not to perform the control by making a selection using the input device 106.

Furthermore, the configuration may be such that choices for the attribute information for determining the control method are displayed in the output device 107, and the user can specify which attribute information is to be used to determine the control method by making a selection using the input device 106.

In addition, the configuration may be such that choices for the control method to be applied to the content list are displayed in the output device 107, and the user can specify which control method to apply to the content list by making a selection using the input device 106.

In addition, the amount of content in the content group held in the respective connected devices may be compared, and the content list may be generated based on the attribute information of the content of the lesser amount. In such a case, when, for example, connections are detected, the number of content groups in the respective devices are compared, and a list is generated from the integrated content based on the attribute information included in the content group whose content amount is lesser. The opposite may also be performed.

The present invention may be applied to a system configured of a plurality of devices (e.g., a host computer, an interface device, a reader, a printer, and so on) or to an apparatus configured of a single device (e.g., a copy machine, a facsimile device, and so on).

Furthermore, the object of the present invention can also be achieved by supplying, to a system or apparatus, a storage medium in which the program code for software that realizes the functions of the aforementioned embodiments has been stored, and causing a computer (CPU or MPU) of the system or apparatus to read out and execute the program code stored in the storage medium.

In such a case, the program code itself read out from the computer-readable storage medium implements the functionality of the aforementioned embodiments, and the storage medium in which the program code is stored composes the present invention.

Examples of a storage medium for supplying the program code include a flexible disk, a hard disk, an optical disk, a magneto-optical disk, a CD-ROM, a CD-R, magnetic tape, a non-volatile memory card, a ROM, and so on.

Moreover, it goes without saying that the following case also falls under the scope of the present invention, which is not limited to implementing the functions of the aforementioned embodiments by a computer executing the read-out program code. That is, the case where an operating system (OS) or the like running in a computer performs part or all of the actual processing based on instructions in the program code, and the functionality of the aforementioned embodiments is realized by that processing, is included in the scope of the present invention.

Furthermore, the program code read out from the storage medium may be written into a memory provided in a function expansion board installed in the computer or a function expansion unit connected to the computer. Then, a CPU or the like included in the function expansion board or expansion unit performs all or part of the actual processing based on instructions included in the program code, and the functions of the aforementioned embodiments may be implemented through that processing. It goes without saying that this also falls within the scope of the present invention.

According to the present invention, method for controlling a content list is determined based upon attribute information of the content included in a content group that is to be integrated, and the content list is processed in accordance with the determined method of control. Through this, it is possible, after integrating the content groups held thus far with a new content group, to automatically display a content list in a format suitable for browsing that centers on the new content group.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-312659 filed Dec. 3, 2007, which is hereby incorporated by reference herein in its entirety.

What is claimed is:

1. An information processing apparatus to which an external device is connected, the information processing apparatus comprising a processor configured to:
transfer, when the external device is newly connected, content included in the external device to the information processing apparatus;
integrate the transferred content with content included in the information processing apparatus to generate an integrated group of content;
create a content list that includes a list of the content in the integrated group of content;
acquire attribute information including date information of the transferred content;
determine whether the integrated group of content includes non-listed content to be excluded from the content list of the integrated group of content based on the attribute information;
exclude non-listed content from the content list if it is determined that the integrated group of content includes the non-listed content; and
display the content list of the integrated group of content excluding the non-listed content, in which the integrated group of content is sorted from content having the oldest date to content having the newest date in order of the date according to the date information,
wherein the content is one or more images.

2. An information processing apparatus including a first content group, to which a device including a second content group is connected, the information processing apparatus comprising a processor configured to:
transfer, when the device is newly connected, the second content group to the information processing apparatus;
integrate the first and second content groups to generate a list of an integrated content group;
create a content list that includes a list of the content in the integrated group of content;
acquire information of a musical genre of content of the integrated content group when a type of the content is music;
determine whether the integrated group of content includes non-listed content to be excluded from the content list of the integrated group of content based on the acquired information;
exclude non-listed content from the content list if it is determined that the integrated group of content includes the non-listed content; and
calculate a distribution of the musical genres of the content;
process the list of integrated content groups based on the distribution so that the content is arranged in order starting with the musical genre with the most content; and
display the content list of the integrated group of content excluding the non-listed content, based on the distribution of the musical genres included in the second content group,
wherein the content is music data.

3. A method of processing executed by an information processing apparatus to which an external device is connected, the method comprising:
transferring, when the external device is newly connected, content included in the external device to the information processing apparatus;
integrating the transferred content with content included in the information processing apparatus to generate an integrated group of content;
creating a content list that includes a list of the content in the integrated group of content;
acquiring attribute information including date information of the transferred content;
determining whether the integrated group of content includes non-listed content to be excluded from the content list of the integrated group of content based on the attribute information;
excluding non-listed content from the content list if it is determined that the integrated group of content includes the non-listed content; and
displaying the content list of the integrated group of content excluding the non-listed content, in which the integrated group of content is sorted from content having the oldest date to content having the newest date in order of the date according to the date information acquired in the acquisition step,
wherein the content is one or more images.

4. A non-transitory computer-readable storage medium on which is stored a program for causing a computer to execute a method of processing executed by an information processing apparatus to which an external device is connected, the method comprising:
transferring, when the external device is newly connected, content included in the external device to the information processing apparatus;
integrating the transferred content with content included in the information processing apparatus to generate an integrated group of content;
creating a content list that includes a list of the content in the integrated group of content;
acquiring attribute information including date information of the transferred content;
determining whether the integrated group of content includes non-listed content to be excluded from the content list of the integrated group of content based on the attribute information;
excluding non-listed content from the content list if it is determined that the integrated group of content includes the non-listed content; and
displaying the content list of the integrated group of content excluding the non-listed content, in which the integrated group of content is sorted from content having the oldest date to content having the newest date in order of the date according to the date information acquired in the acquisition step,
wherein the content is one or more images.

5. A method of processing executed by an information processing apparatus including a first content group, to which a device including a second content group is connected, the method comprising:

transferring, when the external device is newly connected, content included in an external device to the information processing apparatus;
integrating the transferred content with content included in the information processing apparatus to generate an integrated group of content;
creating a content list that includes a list of the content in the integrated group of content;
acquiring information of a musical genre of content of the integrated content group when a type of the content is music;
determining whether the integrated group of content includes the non-listed content to be excluded from the content list of the integrated group of content based on the acquired information;
excluding non-listed content from the content list if it is determined that the integrated group of content includes the non-listed content; and
calculating a distribution of the musical genres of the content;
processing the list of integrated content groups based on the distribution so that the content is arranged in order starting with the genre with the most content; and
displaying the content list of the integrated group of content, excluding the non-listed content, based on the distribution of the musical genres included in the second content group.

6. A non-transitory computer-readable storage medium on which is stored a program for causing a computer to execute a method of processing executed by an information processing apparatus including a first content group, to which an external device including a second content group is connected, the method comprising:
transferring, when the external device is newly connected, content included in the external device to the information processing apparatus;
integrating the transferred content with content included in the information processing apparatus to generate an integrated group of content;
creating a content list that includes a list of the content in the integrated group of content;
acquiring information of a musical genre of content of the integrated content group when a type of the content is music;
determining whether the integrated group of content includes the non-listed content to be excluded from the content list of the integrated group of content based on the acquired information;
excluding non-listed content from the content list if it is determined that the integrated group of content includes the non-listed content; and
calculating a distribution of the musical genres of the content;
processing the list of integrated content groups based on the distribution so that the content is arranged in order starting with the genre with the most content; and
displaying the content list of the integrated group of content, excluding the non-listed content, based on the distribution of the musical genres included in the second content group.

* * * * *